(12) United States Patent
Liu et al.

(10) Patent No.: US 11,832,250 B2
(45) Date of Patent: Nov. 28, 2023

(54) SENSING BASED DYNAMIC ADAPTATION OF SIDELINK TRANSMIT DISCONTINUOUS RECEPTION (DRX) PATTERN

(71) Applicant: QUALCOMM Incorporated, San Diego, CA (US)

(72) Inventors: Chih-Hao Liu, San Diego, CA (US); Jing Sun, San Diego, CA (US); Xiaoxia Zhang, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 17/212,785

(22) Filed: Mar. 25, 2021

(65) Prior Publication Data
US 2022/0312398 A1    Sep. 29, 2022

(51) Int. Cl.
*H04W 72/20*     (2023.01)
*H04W 76/28*     (2018.01)

(52) U.S. Cl.
CPC ........... *H04W 72/20* (2023.01); *H04W 76/28* (2018.02)

(58) Field of Classification Search
None
See application file for complete search history.

(56) References Cited

U.S. PATENT DOCUMENTS

| | | | |
|---|---|---|---|
| 2013/0322413 A1* | 12/2013 | Pelletier | H04W 76/14 370/336 |
| 2016/0286487 A1* | 9/2016 | Sachs | H04W 52/0216 |
| 2021/0227602 A1* | 7/2021 | Li | H04W 76/23 |
| 2021/0227620 A1* | 7/2021 | Pan | H04W 4/40 |
| 2021/0227621 A1* | 7/2021 | Pan | H04W 72/0446 |
| 2021/0227622 A1* | 7/2021 | Kung | H04W 72/0406 |
| 2021/0251037 A1* | 8/2021 | Akkarakaran | H04W 76/28 |
| 2021/0267008 A1* | 8/2021 | Dutta | H04W 76/28 |
| 2021/0267009 A1* | 8/2021 | Van Phan | H04W 52/0254 |
| 2021/0385710 A1* | 12/2021 | Jin | H04W 36/0072 |
| 2022/0030661 A1* | 1/2022 | Jeong | H04W 72/0406 |
| 2022/0141716 A1* | 5/2022 | Chen | H04W 72/0406 370/329 |
| 2022/0232667 A1* | 7/2022 | Back | H04W 76/28 |
| 2023/0014303 A1* | 1/2023 | Di Girolamo | H04W 72/20 |

FOREIGN PATENT DOCUMENTS

| | | | | |
|---|---|---|---|---|
| WO | WO-2018064477 A1 * | 4/2018 | | |
| WO | WO-2021119474 A1 * | 6/2021 | ............ | H04W 76/28 |
| WO | WO-2021165208 A1 * | 8/2021 | | |

* cited by examiner

*Primary Examiner* — Jamaal Henson
(74) *Attorney, Agent, or Firm* — Patterson & Sheridan, L.L.P/Qualcomm Incorporated

(57) ABSTRACT

Aspects of the present disclosure provide apparatus, methods, processing systems, and computer readable mediums for decoding, by a first user equipment (UE), a sidelink control information (SCI) from at least a second UE, the SCI indicating time resources reserved for future transmission to a third UE; and adapting a sidelink transmit discontinuous reception (DRX) pattern of the first UE based on the indicated time resources.

28 Claims, 9 Drawing Sheets

SENSING BASED DYNAMIC ADAPTATION OF SIDELINK TRANSMIT DISCONTINUOUS RECEPTION (DRX) PATTERN

INTRODUCTION

Aspects of the present disclosure relate to wireless communications, and more particularly, to sidelink communication between wireless devices.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims, which follow, some features will now be discussed briefly. After considering this discussion, and particularly after reading the section entitled "Detailed Description" one will understand how the features of this disclosure provide advantages that include improved sidelink communication techniques.

Certain aspects provide a method for wireless communication by a first user-equipment (UE). The method generally includes decoding a sidelink control information (SCI) from at least a second UE, the SCI indicating time resources reserved for future transmission to a third UE; and adapting a sidelink transmit discontinuous reception (DRX) pattern of the first UE based on the indicated time resources.

Certain aspects provide an apparatus for wireless communication by a first UE. The apparatus generally includes a memory, and one or more processors coupled to the memory, the one or more processors and the memory being configured to: decode a sidelink control information (SCI) from at least a second UE, the SCI indicating time resources reserved for future transmission to a third UE; and adapt a sidelink transmit discontinuous reception (DRX) pattern of the first UE based on the indicated time resources.

Certain aspects provide an apparatus for wireless communication by a first UE. The apparatus generally includes means for decoding a sidelink control information (SCI) from at least a second UE, the SCI indicating time resources reserved for future transmission to a third UE; and means for adapting a sidelink transmit discontinuous reception (DRX) pattern of the first UE based on the indicated time resources.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
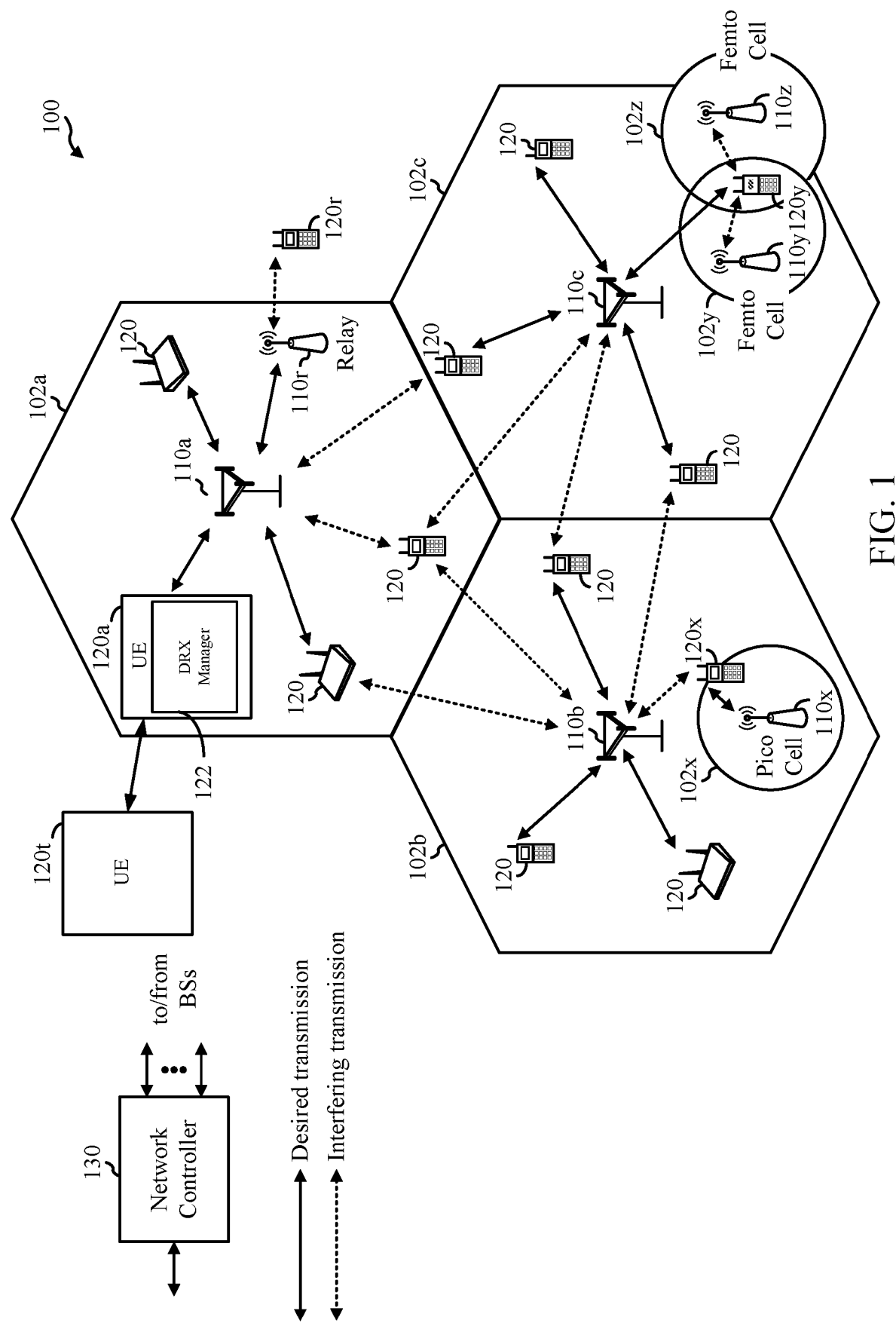
FIG. 1 is a block diagram conceptually illustrating an example telecommunications system, in accordance with certain aspects of the present disclosure.

Aspects of the present disclosure provide apparatus, methods, processing systems, and computer readable mediums for dynamically adapting a sidelink transmit discontinuous reception (DRX) pattern of a first UE based on channel sensing involving detecting sidelink control information (SCI) from a second UE. For example, the first UE may adapt its sidelink transmit DRX pattern based on an indication, provided in the SCI, of time resources reserved for future transmission to a third UE.

For example, in a unicast scenario, a transmitter sidelink UE (i.e., the first UE) may predict a receiver sidelink UE's (i.e., the third UE's) reception patterns (e.g., DRX patterns) for another transmitter sidelink UE (i.e., the second UE). Based on the prediction, the transmitter sidelink UE may dynamically adapt its transmission pattern (e.g., DRX pattern). Similarly, in groupcast/broadcast cases, the SCI sensing based DRX estimation can be reused when the transmitter sidelink UE knows the group ID for groupcast and source ID for broadcasting. In some cases, when the initially sensed SCI disappears, the corresponding pattern adaptation may be suspended.

To both conserve power consumption and maintain the capacity to receive data, periodic repetitions of "sleep mode and wake up mode," i.e., DRX, are used. When multiple (e.g., three or more) UEs communicating in sidelink have different DRX configurations, resources may be wasted when one UE enters the sleep mode while others are staying awake. The DRX patterns are often configured by a network entity (e.g., gNB, via Uu links) and reused in sidelink communications. As such, when multiple UEs have different DRX patterns configured by respective network entities, the DRX discrepancies may cause utilization inefficiency.

The present disclosure provides techniques for overcoming such problems by dynamically adapting or adjusting a transmitter UE's own DRX pattern based on estimating DRX patterns of other sidelink UEs.

The following description provides examples of configurations for SL communication in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method, which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may include one or more UEs 120 configured to determining whether other UEs are within range for communication using SL configured with discontinuous reception (DRX). As shown in FIG. 1, the UE 120a includes a Sidelink DRX manager 122. The Sidelink DRX manager 122 may be configured to transmit or receive keep alive signaling, as described in more detail herein.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
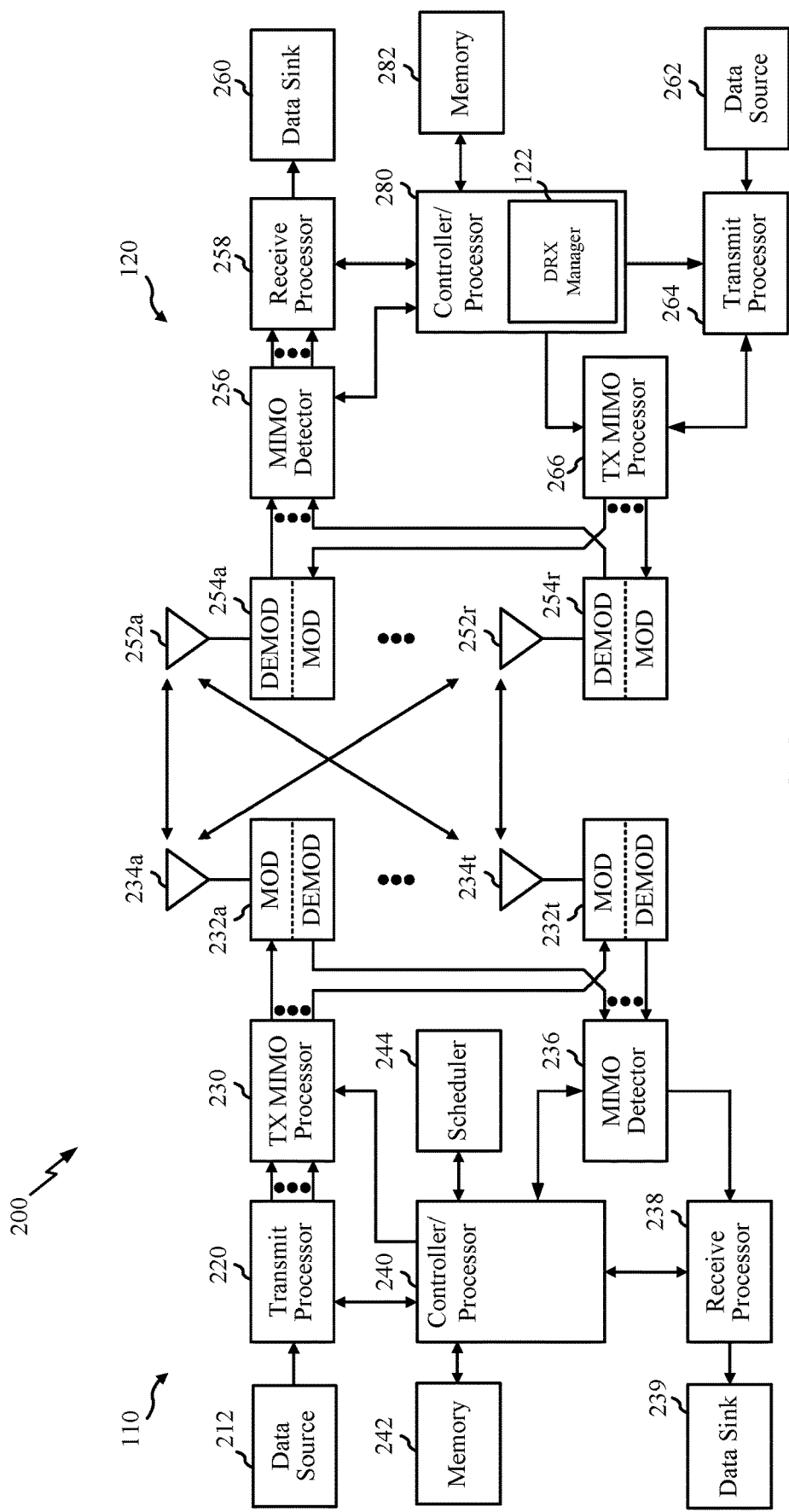
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. As shown in FIG. 2, the controller/processor 280 of the UE 120a has the Sidelink DRX manager 122. Although shown at the Controller/Processor, other components of the UE 120a may be used performing the operations described herein.

Figure 3B:
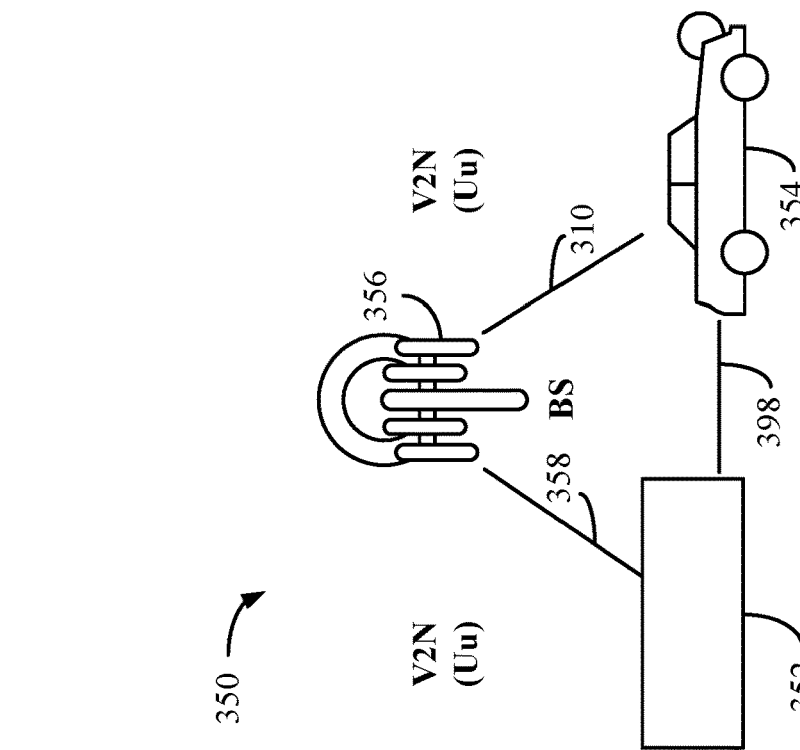
FIGS. 3A and 3B show diagrammatic representations of example vehicle to everything (V2X) systems in accordance with some aspects of the present disclosure.
Figure 3A:
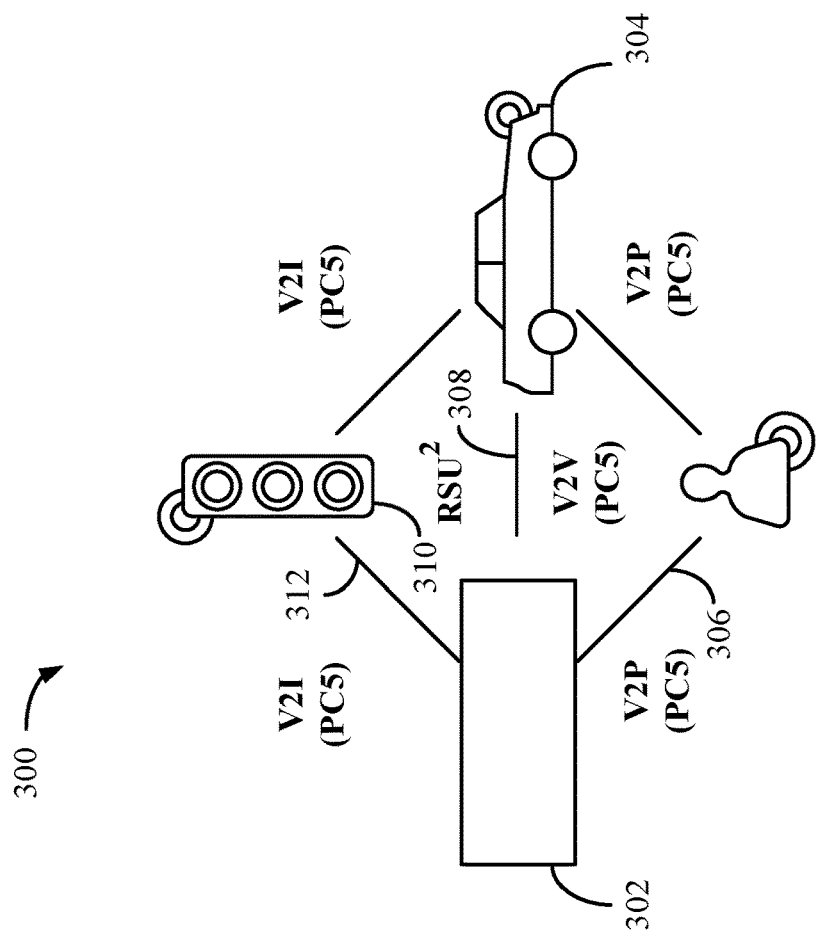

FIGS. 3A and 3B show diagrammatic representations of example vehicle to everything (V2X) systems in accordance with some aspects of the present disclosure. For example, the UEs shown in FIGS. 3A and 3B may communicate via sidelink channels and may perform sidelink CSI reporting as described herein.

The V2X systems, provided in FIGS. 3A and 3B provide two complementary transmission modes. A first transmission mode, shown by way of example in FIG. 3A, involves direct communications (for example, also referred to as side link communications) between participants in proximity to one another in a local area. A second transmission mode, shown by way of example in FIG. 3B, involves network communications through a network, which may be implemented over a Uu interface (for example, a wireless communication interface between a radio access network (RAN) and a UE). As illustrated, UEs 352, 354 may communicate with each other using a sidelink (SL) 398.

Referring to FIG. 3A, a V2X system 300 (for example, including vehicle to vehicle (V2V) communications) is illustrated with two UEs 302, 304 (e.g., vehicles). The first transmission mode allows for direct communication between different participants in a given geographic location. As illustrated, a vehicle can have a wireless communication link 306 with an individual (V2P) (for example, via a UE) through a PC5 interface. Communications between the UEs 302 and 304 may also occur through a PC5 interface 308. In a like manner, communication may occur from a UE 302 to other highway components (for example, highway component 310), such as a traffic signal or sign (V2I) through a PC5 interface 312. With respect to each communication link illustrated in FIG. 3A, two-way communication may take place between elements, therefore each element may be a transmitter and a receiver of information. The V2X system 300 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 3B shows a V2X system 350 for communication between a UE 352 (e.g., vehicle) and a UE 354 (e.g., vehicle) through a network entity 356. These network communications may occur through discrete nodes, such as a base station (for example, an eNB or gNB), that sends and receives information to and from (for example, relays information between) UEs 352, 354. The network communications through vehicle to network (V2N) links (e.g., Uu links 358 and 310) may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as channel state information (CSI) related to a sidelink channel quality.

Example Techniques for Sidelink Dynamic
Adaptation of Discontinuous Reception (DRX)
Pattern Based on Sensing In a discontinuous reception (DRX) mode of operation, a UE may go into a low power ("sleep") mode (also referred to herein as a "sleep phase"), which may also be referred to as a low power state, for a certain period of time (referred to as a DRX OFF period, phase, or duration) and wakes up again during a DRX ON (e.g., awake phase) period (referred to as a DRX ON period or duration) to check if there is any data to be received. The cycle of sleep and wake-up (DRX ON and DRX OFF) periods repeats over time, allowing the UE to save power while maintaining communication.

Figure 4:
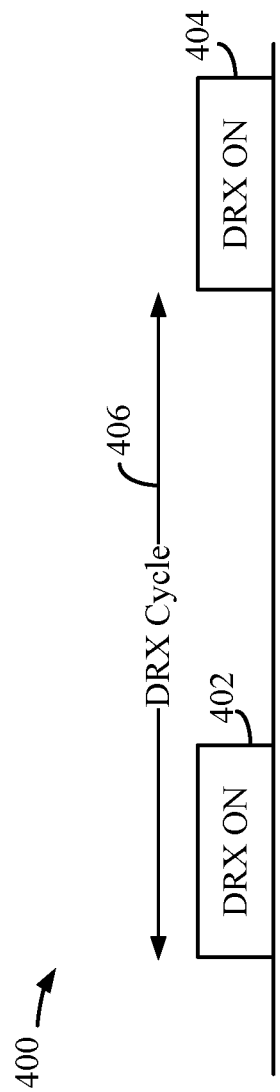
FIG. 4 illustrates an example discontinuous reception (DRX) configuration of a UE, in some aspects.

FIG. 4 illustrates an example DRX configuration 400 of a UE. As illustrated, the DRX configuration 400 may include DRX ON periods 402, 404, and similar repetitions in other cycles not shown. As described herein, a DRX ON period repeats every DRX cycle. For example, the DRX ON period 402 is during DRX cycle 406, as illustrated. The UE is awake during the DRX ON periods 402, 404 to monitor for signaling that may be received, and in a low power state (e.g., sleep phase) at other times (also referred to as DRX sleep phase or OFF periods, such as the time gap between the ON periods 402 and 404).

Different methods may be used for utilizing and configuring DRX modes for sidelink communications. In some cases, a transmission pattern may be determined with the goal of making the most use of the awake phase and maximizes the duration of sleep phase without sacrificing communication abilities. Three general priority options may be selected for the DRX configuration: a transmitter (TX) UE centric option, a receiver (RX) UE centric option, and a (TX and RX) cooperative option.

In the TX UE centric option, when a TX UE establishes a sidelink connection with an RX UE, the TX UE may determine its preferred transmission pattern and exchange the preferred transmission pattern with peer UE(s). In this case, an RX UE may be expected to be awake (i.e., configured with DRX ON periods) to listen during DRX ON periods according to the transmission pattern of the peer UEs.

In the RX UE centric option, each UE may determine its preferred reception pattern and exchanges the reception pattern with its peer UE(s). In this case, a TX UE may be expected to transmit to its peer UE only within the reception pattern of the peer UE. This option may be suitable for V2X service with sparse traffic and/or when power consumption is a primary concern.

In the cooperative option, for sidelink unicast, the transmission patterns may be negotiated by TX and RX UEs. A negotiated DRX pattern may then be shared by the TX and RX UEs.

Figure 5:
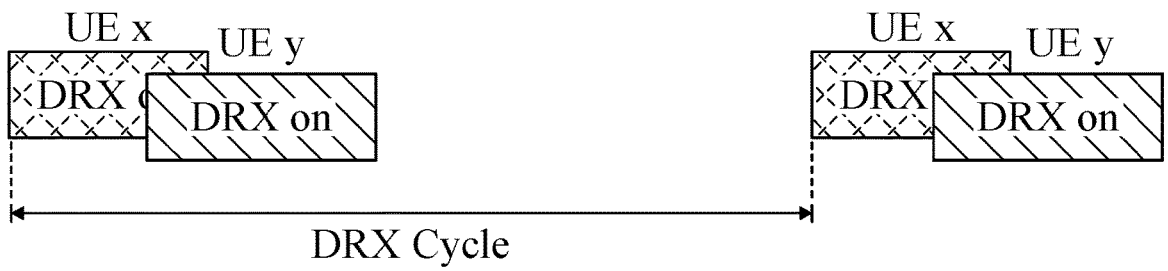
FIG. 5 illustrates DRX cycles of two different UEs, in some aspects.

FIG. 5 illustrates an example of sidelink DRX cycles for two different UEs, UE x and UE y. As shown, the DRX cycle of UE x (i.e., the first UE) and the DRX cycle of UE y (i.e., the second UE) may have a common periodicity and a same DRX ON period. The DRX ON period may be offset by a time value (referred to as a DRX offset). In some cases, the DRX cycles may be configured by the network and reused in sidelinks. Because the TX UEs may have different transmission patterns, such as different periodicities, different DRX ON periods, and/or different DRX offsets when there are three or more UEs, a RX UE in sidelink communications with two or more of such TX UEs needs monitor, in superposition, of all the possible transmission patterns from the two or more TX UEs.

Referring to the offset DRX cycles of UE x and UE y in FIG. 5, a hypothetical third UE, namely UE z, in sidelink communication with UE x and UE y may need to monitor both sets of DRX ON periods. Doing so, however, UE z may potentially lose communication efficiency when UE x gets into DRX OFF periods while UE y is still in DRX ON periods, as UE z is capable of receiving packets from UE x at the end of or after UE x's DRX ON periods. That is, if UE x knows that UE z is capable of receiving due to UE y's DRX configuration, UE x may choose to send data to UE z outside of the original DRX ON periods.

Aspects of the present disclosure provides techniques for enabling a TX UE (such as UE x in the example) to dynamically adapt/adjust the transmission patterns based on an estimated DRX pattern of an RX UE, by decoding information from SCI transmitted by other TX UEs regarding future resources reserved for transmission to that RX UE.

For sidelink communications, resources may be allocated differently in Mode 1 and in Mode 2. In Mode 1 sidelink communication, the sidelink resources are often scheduled by a gNB. In Mode 2 sidelink communication, the UE may autonomously select sidelink resources from a (pre)configured sidelink resource pool(s) based on the channel sensing mechanism. When the UE is in-coverage, a gNB may be configured to adopt Mode 1 or Mode 2. When the UE is out of coverage, only Mode 2 may be adopted.

Figure 9:
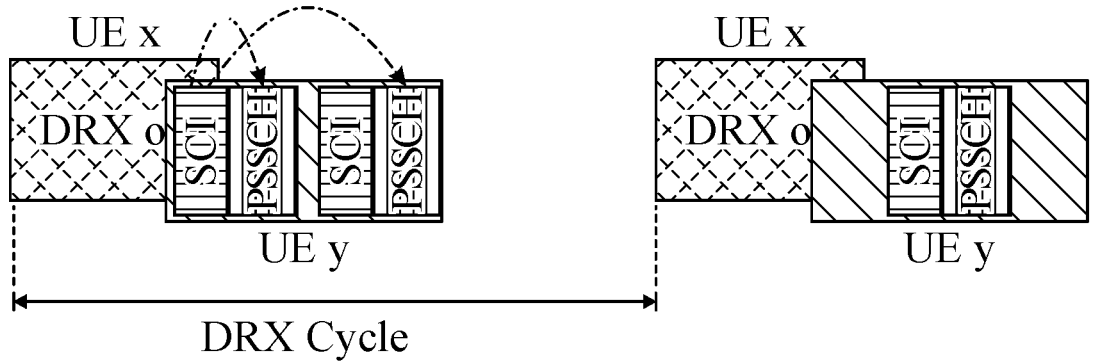
FIG. 9 illustrates an example DRX timeline of two transmitter UEs, in accordance with certain aspects of the present disclosure.

In Mode 2, when traffic arrives at a transmitting UE, the transmitting UE may select resources for PSCCH and PSSCH, and/or reserve resources for retransmissions to minimize latency. Therefore, in conventional configurations the transmitting UE would select resources for PSSCH associated with PSCCH for initial transmission and blind retransmissions, which incurs unnecessary resources and the related power consumption. To avoid such resource waste and other similar resource duplication/blind reservation/redundancy, the UEs in sidelink communication may communicate, as shown in FIG. 9, to use a subset of the resources.

Figure 6:
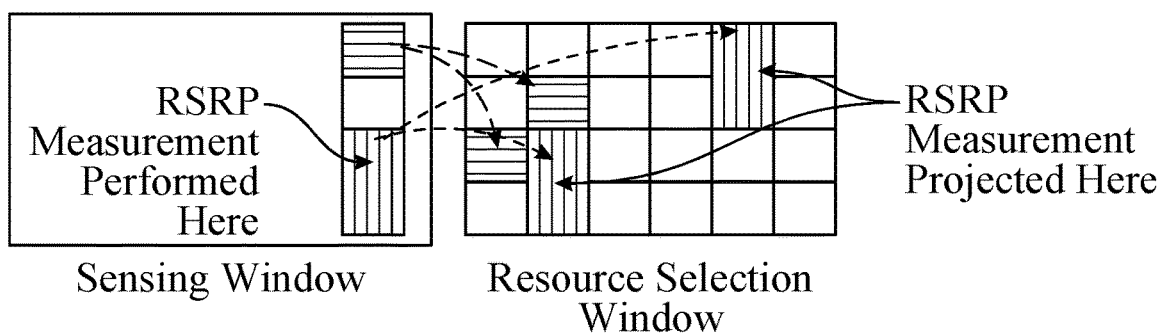
FIG. 6 illustrates an example sensing window and a resource selection window, in accordance with certain aspects of the present disclosure.

FIG. 6 illustrates an example sensing window and a resource selection window, in accordance with certain aspects of the present disclosure. A UE, in Mode 2 during candidate resource identification or sensing, may determine whether a resource is available or not by decoding SCIs.

For example, the UE may first measure received power (e.g., reference signal received power, or RSRP) for SCI transmissions within a sensing window. The RSRP may be measured on PSCCH or PSSCH DMRS according to configuration or pre-configuration. The length of the sensing window (where SCI is decoded) may be configured or pre-configured. In Mode 2, a sidelink TX UE may perform sensing for a time period of 100 ms to 1000 ms in order to avoid collision.

In the sensing window, the TX UE may decode the SCI to determine if a resource is available in the resource selection window (e.g., as shown in FIG. 6). If an SCI is detected (e.g., RSRP above a threshold value), the UE may decode the SCI to determine the reservation of resources within a resource selection window.

As will be described in greater detail below, a SL TX UE may decode SCI in this manner to gather resource reservation information, estimate a sidelink receive DRX pattern for a target UE based on this information, and adapt its own sidelink transmit DRX pattern for communicating with that UE.

Figure 7:
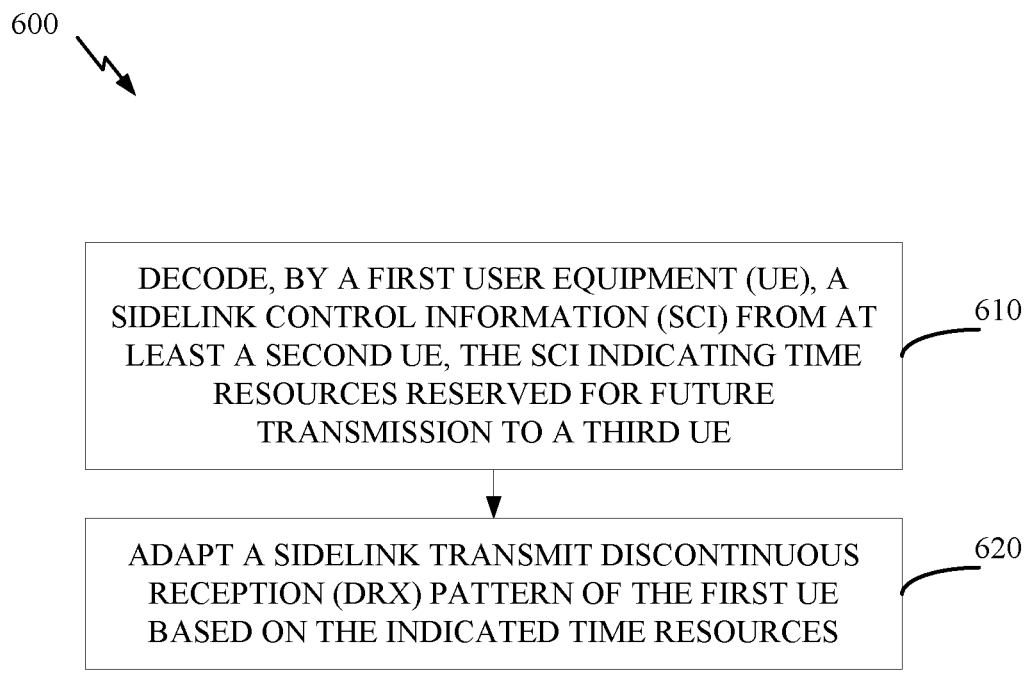
FIG. 7 is a flow diagram illustrating example operations for wireless communication, in accordance with certain aspects of the present disclosure.

FIG. 7 is a flow diagram illustrating example operations 700 for wireless communication, in accordance with certain aspects of the present disclosure. The operations 700 may be performed, for example, by a first UE (e.g., such as the UE 120a in the wireless communication network 100 in FIG. 1, or the UE x in FIGS. 8-11). The first UE with respect to the operations 700 may be referred to as a first TX UE.

Operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 272 of FIG. 2). In certain aspects, the transmission and/or reception of signals by the UE may be implemented via a bus interface of one or more processors (e.g., controller/processor 280) obtaining and/or outputting signals.

Operations 700 begin, at 710, by decoding, by the first UE, a sidelink control information (SCI) from at least a second UE, such as a second TX UE. The SCI indicates time resources reserved for future transmission to a third UE. For example, the third UE may be an RX UE connected to the first and the second TX UEs in sidelink.

At 720, the first UE adapts a sidelink transmit discontinuous reception (DRX) pattern of the first UE based on the indicated time resources. For example, the transmit DRX pattern of the first UE is for the sidelink between the first UE and the third UE (e.g., when the first UE is in the DRX ON periods, the first UE may transmit data to the third UE and the third UE listens).

Operations 700 and related techniques may be understood together with reference to the illustrations in FIGS. 8-11.

Figure 8:
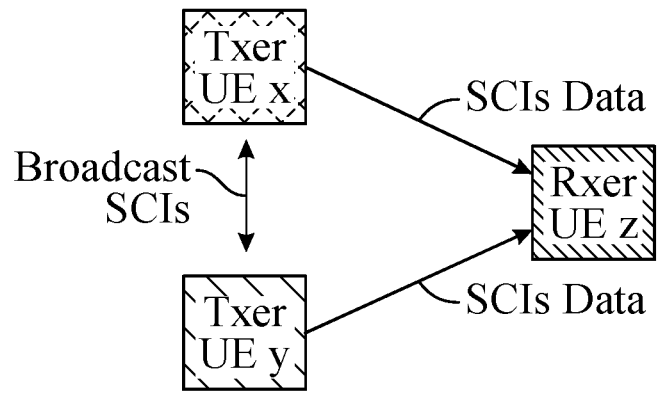
FIG. 8 illustrates an example of three UEs (two transmitter UEs and one receiver UE) in sidelink communications, in accordance with certain aspects of the present disclosure.

FIG. 8 illustrates an example of sidelink communication between three UEs: two transmitter UEs (UE x and UE y) and one receiver UE (UE z) in sidelink communications. As shown, UE x and UE y, may broadcast SCIs and receive the SCIs from each other. UE x and UE y may respectively transmit SCIs and data to the RX UE z. Conventionally, the DRX pattern of UE y (for communicating with UE z) is unknown to UE x. According to the present disclosure, however, UE x may derive or estimate such information. That is, by decoding the broadcast SCIs from UE y (e.g., decoding during a sensing window), UE x may predict UE z's reception patterns for the sidelink between UEz and UEy.

For example, by decoding SCIs from UE y, UE x may identify UE z from a destination ID included in the SCIs broadcast by UE y. In some cases, decoding SCIs from UE y may include identifying a source ID field indicating UE y's ID and identifying the link between UE z and UE y by identifying the source and destination ID pair.

UE x may derive a sidelink receive DRX pattern of UE z based on the indicated time resources in subsequent SCIs including the destination ID. The sidelink receive DRX pattern of UE z is with respect to the sidelink between UE z and UE y (i.e., the sidelink between the second UE and the third UE). For example, when UE z is in DRX ON periods, UE z listens to UE y for data transmission and correspondingly, UE y's transmit DRX pattern may match UE z's receive DRX pattern absent other configurations. For example, the SCI time allocation field may indicate the current and possible future reserved slots for transmission. From the received SCIs associated with UE z, UE x may derive UE z's reception patterns associated with other TX UEs, such as UE y. An example of such derivation is shown in FIG. 9.

FIG. 9 illustrates an example DRX timeline for UE x and UE y. For purposes of illustration, it may be assumed that UE x and UE y are both transmitting to UE z according to their respective DRX configurations. When UE x senses SCIs from UE y in UE y's DRX ON duration, UE x may identify that UE y is transmitting to the same UE z based on the decoded SCI. UE x may estimate UE y's DRX configuration for UE z, including UE y's DRX period, ON duration, and offset (from the DRX of UE x).

Figure 10:
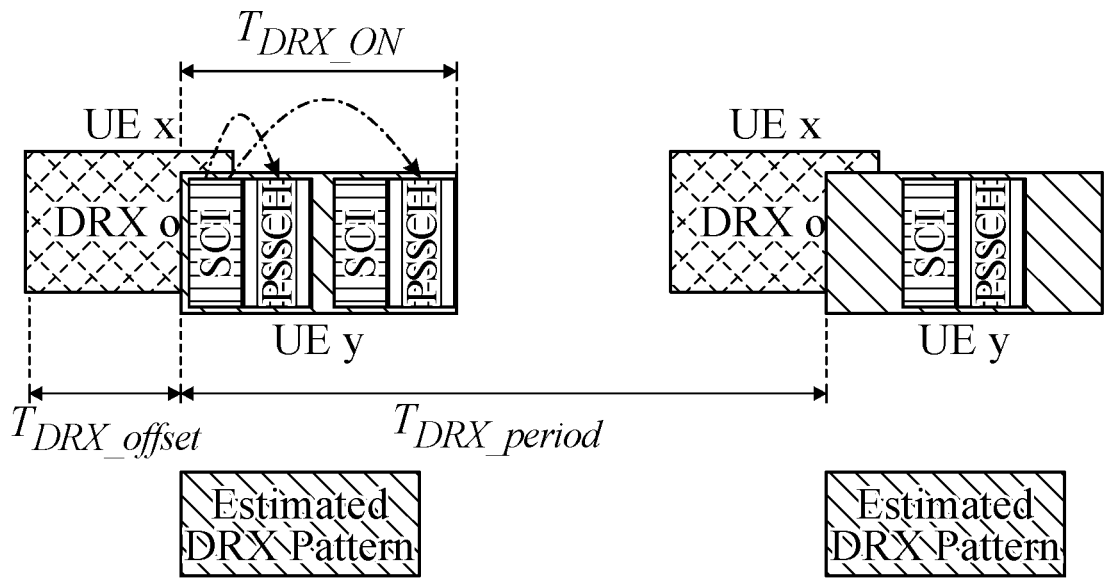
FIG. 10 illustrates an example DRX pattern estimation based on sensing, in accordance with certain aspects of the present disclosure.

FIG. 10 illustrates an example of the DRX pattern estimated by UEx based on information in UE y SCIs decoded by UE x. As shown, the estimated DRX pattern may span from the onset of the DRX ON duration of UE y to a completion of PSSCH transmission of the second SCI in UE y. As shown, the DRX pattern of UE y may be represented or expressed using the DRX period, the DRX ON duration, and the DRX offset (measured based on the different onset times of UE x and UE y).

In aspects, this DRX pattern estimation may be realized by solving an integer programming expression with the slot indices of the matching SCIs. The expression can be expressed as:

$$\min_{T_{DRX\_period}, T_{DRX\_offset}, T_{DRX\_ON}} \left( \Sigma_i \left| n_i \cdot T_{DRX_{period}} + t_{DRX_{ON},i} + T_{DRX_{offset}} - n_{sci,i} \right|^2 + \left| T_{DRX_{ON}} \right|^2 + \left| \frac{1}{T_{DRX_{period}}} \right|^2 \right).$$

In the expression, $n_{sci,i}$ is the slot index of the i-th SCI for the UE y to UE z link; $n_i \in Z$ is the DRX ON instance index that the i-th SCI is located and $0 \leq t_{DRX_{ON},i} < T_{DRX\_ON}$; and $T_{DRX\_period}$ is DRX cycle from a set of possible values, $T_{DRX\_ON}$ is DRX ON duration and $T_{DRX\_offset}$ is DRX slot offset. The optimization problem may be solved by trying to fit the sensed matching SCI instance is fitted with a predefined set of DRX patterns. In such cases, a pattern with the maximum DRX period may be identified.

As shown in FIG. 10, UE y may transmit two sets of SCI and PSSCH during its DRX ON duration, the DRX period corresponding to the latter SCI (thus a greater DRX period) is identified. As such, deriving the sidelink receive DRX pattern for UE z can be carried out by matching the indicated time resources in SCIs with the predefined set of DRX patterns. In some cases, solving the expression may result in two or more solutions and lead to different estimations. In some cases, the more SCIs are sensed by UE x, the more accurate the DRX patterns estimation can be achieved.

In addition to using a common destination ID to identify UE z in unicast situations, as described above, UE x may also receive an indication that UE z intends to listen for groupcast sidelink communications and an ID associated with the group cast sidelink communications. In some cases, the destination field in SCI may contain a truncated group ID from upper layer and the group ID may be shared among a group of RX UEs. Thus for groupcast, UE z may communicate with UE x in higher layer to indicate the intention to listen for a groupcast and the group ID or group&source ID. UE x may decode SCI(s) matching the ID associated with the groupcast sidelink communications. Based on the decoded SCI(s), UE x may estimate a sidelink receive DRX pattern of UE z based on the indicated time resources in the SCI matching the ID associated with the groupcast sidelink communications. For example, upon notification, UE x may filter the SCI with cast type indicator being groupcast and matching IDs. Once identified, the DRX pattern estimation techniques applied in unicast cases is similarly applicable.

For broadcast cases, UE z may communicate with UE x and UE y in higher layer to indicate UE z's intention to listen for a broadcast from a source ID. As such, UE x or UE y may receive such indication from UE z. UE x may decode broadcast SCI matching the source ID. UE x may estimate a sidelink receive DRX pattern of UE z based on the indicated time resources in the SCI matching the ID associated with the groupcast sidelink communications. For example, upon notification, UE z may start to listen for the broadcast SCI with a matching source ID. UE x may filter the SCI with cast type indicator being broadcast and filter with the matching IDs. Once identified, the DRX pattern estimation techniques applied in unicast cases is similarly applicable.

Figure 11:
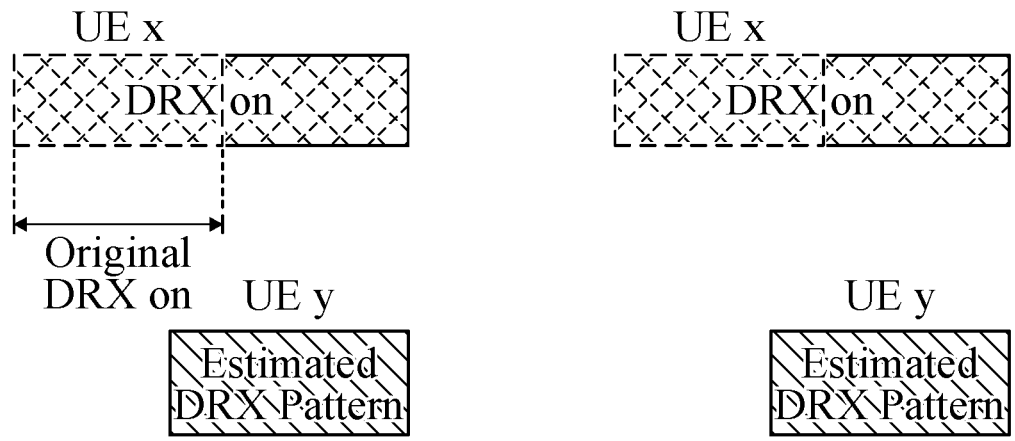
FIG. 11 illustrates an example dynamic adaptation of DRX pattern in one UE based on an estimated DRX pattern in another UE, in accordance with certain aspects of the present disclosure.

FIG. 11 illustrates how UE x may transmit on an additional portion of a dynamic adaptation of DRX pattern. With UE x successfully estimating the DRX pattern of UE y, with respect to the reception DRX pattern of UE z, UE x may transmit to UE z on an additional (e.g., extended, expanded, adapted, modified, or updated) DRX pattern, such as to maximize the use of UE z's DRX ON periods. That is, based on the estimated sidelink receive DRX pattern of UE z, UE x may adapt the sidelink transmit DRX pattern by transmitting, on an additional portion (the portion of the DRX ON duration of UE x outside of the original DRX ON duration bounded by the shown dashed rectangle box) of the transmit DRX pattern. That is, adapting the sidelink transmit DRX pattern of UE x may include transmitting on the additional portion of the transmit DRX pattern based on the estimated sidelink receive DRX pattern of UE z.

In aspects, if the additional portion of the transmit DRX pattern overlaps with a configured DRX pattern with a same period, UE x may dynamically adapt/adjust the configured DRX pattern based on a union of the additional portion and the configured DRX pattern. Otherwise, UE x may adapt the sidelink transmit DRX pattern by adding the additional portion of the transmit DRX pattern to a configured DRX pattern dynamically.

In aspects, the sidelink associated with additional DRX patterns may reconfigure its DRX pattern or even stop DRX. In some cases, a timer and other mechanisms may be employed to detect and/or handle outdated DRX patterns.

For example, UE x may transmit on the additional portion before the expiration of a timer, which may be preset by default or signaled. In some, UE x may be configured to reset the timer (only) upon detecting additional SCIs indicating time resources that match the additional portion. For example, UE x may detect only the matching SCIs within the additional DRX pattern. In this context, matching SCIs refer to SCIs where the destination and/or source ID fields match the sidelink associated with the additional DRX pattern.

Upon expiration of the timer, UE x may suspend transmission on the additional portion of the DRX pattern. Subsequently, UE x may attempt to estimate another sidelink receive DRX pattern based on time resources indicated in any additional decoded SCI, such as when UE x senses other matching SCIs.

Figure 12:
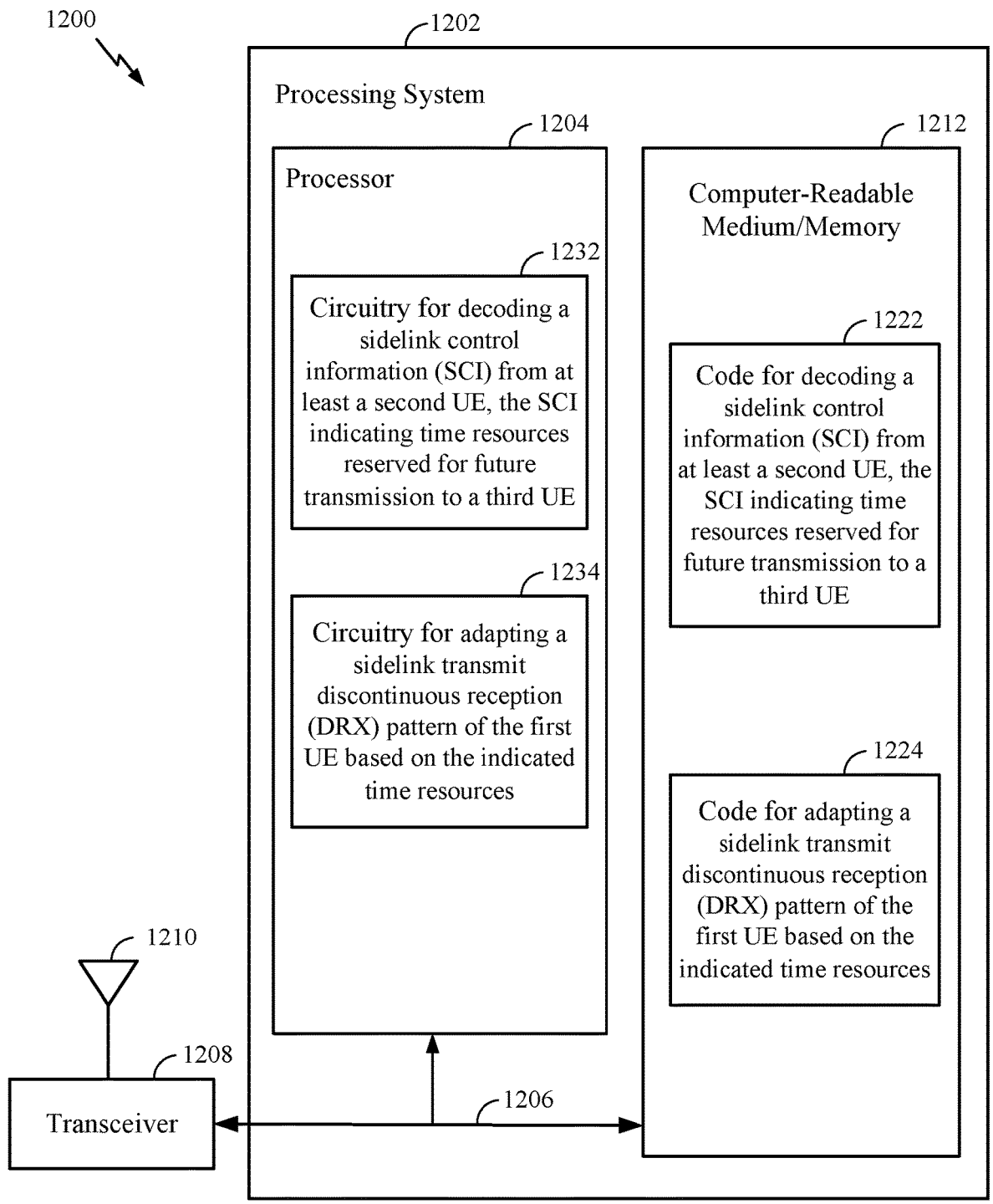
FIG. 12 illustrates a communications device that may include various components configured to perform operations for the techniques disclosed herein.

FIG. 12 illustrates a communications device 1200 that may include various components (e.g., corresponding to means-plus-function components) configured to perform operations for the techniques disclosed herein, such as the operations illustrated in FIG. 7. The communications device 1200 includes a processing system 1202 coupled to a transceiver 12012. The transceiver 12012 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 7. In certain aspects, computer-readable medium/memory 1212 stores code 1222 for decoding a sidelink control information (SCI) from at least a second UE, the SCI indicating time resources reserved for future transmission to a third UE, and code 1224 for adapting a sidelink transmit discontinuous reception (DRX) pattern of the first UE based on the indicated time resources. In certain aspects, the processor 1204 has circuitry configured to implement the code stored in the computer-readable medium/memory 1212. The processor 1204 includes circuitry 1232 for decoding an SCI from at least a second UE, the SCI indicating time resources reserved for future transmission to a third UE, and circuitry 1234 for adapting a sidelink transmit DRX pattern of the first UE based on the indicated time resources.

Example Aspects

Aspect 1: A method for wireless communications by a first user equipment (UE), comprising: decoding a sidelink control information (SCI) from at least a second UE, the SCI indicating time resources reserved for future transmission to a third UE; and adapting a sidelink transmit discontinuous reception (DRX) pattern of the first UE based on the indicated time resources.

Aspect 2: The method of Aspect 1, further comprising: identifying the third UE from a destination ID included in the SCI; and deriving a sidelink receive DRX pattern of the third UE based on the indicated time resources in subsequent SCIs including the destination ID.

Aspect 3: The method of Aspect 1 or 2, wherein deriving the sidelink receive DRX pattern for the third UE comprises estimating a DRX period, ON duration, and offset, for the second UE to transmit to the third UE.

Aspect 4: The method of Aspect 1 or 2, wherein deriving the sidelink receive DRX pattern for the third UE comprises matching indicated time resources in SCIs with a predefined set of DRX patterns.

Aspect 5: The method of any one of Aspects 1 to 4, further comprising receiving an indication that the third UE intends to listen for groupcast sidelink communications and an ID associated with the groupcast sidelink communications.

Aspect 6: The method of any one of Aspects 1 to 5, further comprising: decoding SCI matching the ID associated with the groupcast sidelink communications; and estimating a sidelink receive DRX pattern of the third UE based on the indicated time resources in the SCI matching the ID associated with the groupcast sidelink communications.

Aspect 7: The method of any one of Aspects 1 to 6, further comprising receiving an indication that the third UE intends to listen for broadcast sidelink communications from a source ID.

Aspect 8: The method of any one of Aspects 1 to 7, further comprising: decoding broadcast SCI matching the source ID; and estimating a sidelink receive DRX pattern of the third UE based on the indicated time resources in the SCI matching the ID associated with the groupcast sidelink communications.

Aspect 9: The method of any one of Aspects 1 to 8, wherein adapting the sidelink transmit DRX pattern of the first UE comprises transmitting on an additional portion of the transmit DRX pattern based on an estimated sidelink receive DRX pattern of the third UE.

Aspect 10: The method of Aspect 9, wherein adapting the sidelink transmit DRX pattern comprises, if the additional portion of the transmit DRX pattern overlaps with a configured DRX pattern with a same period, dynamically adjusting the configured DRX pattern based on a union of the additional portion and the configured DRX pattern.

Aspect 11: The method of Aspect 9, wherein adapting the sidelink transmit DRX pattern comprises adding the additional portion of the transmit DRX pattern to a configured DRX pattern dynamically.

Aspect 12: The method of Aspect 9, wherein the first UE transmits on the additional portion before expiration of a timer.

Aspect 13: The method of Aspect 12, further comprising resetting the timer upon detecting additional SCIs indicating time resources that match the additional portion.

Aspect 14: The method of Aspect 12, further comprising, upon expiration of the timer: suspending transmission on the additional portion; and attempting to estimate another sidelink receive DRX pattern based on time resources indicated in additional decoded SCI.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, ... slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a first user equipment (UE), comprising:
   decoding a sidelink control information (SCI) from at least a second UE, the SCI indicating time resources reserved for future transmission to a third UE; and
   adapting a sidelink transmit discontinuous reception (DRX) pattern of the first UE based on the indicated time resources, wherein adapting the sidelink transmit DRX pattern of the first UE comprises transmitting on an additional portion of the transmit DRX pattern based on an estimated sidelink receive DRX pattern of the third UE.

2. The method of claim 1, further comprising:
   identifying the third UE from a destination ID included in the SCI; and
   deriving a sidelink receive DRX pattern of the third UE based on the indicated time resources in subsequent SCIs including the third UE destination ID.

3. The method of claim 2, wherein deriving the sidelink receive DRX pattern for the third UE comprises:
   estimating a DRX period, ON duration, and offset, for the second UE to transmit to the third UE.

4. The method of claim 2, wherein deriving the sidelink receive DRX pattern for the third UE comprises matching indicated time resources in SCIs with a predefined set of receive DRX patterns.

5. The method of claim 1, further comprising receiving an indication that the third UE intends to listen for groupcast sidelink communications and an ID associated with the groupcast sidelink communications.

6. The method of claim 1, further comprising:
   decoding SCI matching the ID associated with the groupcast sidelink communications; and
   estimating a sidelink receive DRX pattern of the third UE based on the indicated time resources in the SCI matching the ID associated with the groupcast sidelink communications.

7. The method of claim 1, further comprising receiving an indication that the third UE intends to listen for broadcast sidelink communications from a source ID.

8. The method of claim 1, further comprising:
   decoding broadcast SCI matching the source ID; and
   estimating a sidelink receive DRX pattern of the third UE based on the indicated time resources in the SCI matching the ID associated with the groupcast sidelink communications.

9. The method of claim 1, wherein adapting the sidelink transmit DRX pattern comprises, if the additional portion of the transmit DRX pattern overlaps with a configured DRX pattern with a same period, dynamically adjusting the configured DRX pattern based on a union of the additional portion and the configured DRX pattern.

10. The method of claim 1, wherein adapting the sidelink transmit DRX pattern comprises adding the additional portion of the transmit DRX pattern to a configured DRX pattern dynamically.

11. The method of claim 1, wherein the first UE transmits on the additional portion before expiration of a timer.

12. The method of claim 11, further comprising resetting the timer upon detecting additional SCIs indicating time resources that match the additional portion.

13. The method of claim 11, further comprising, upon expiration of the timer:
   suspending transmission on the additional portion; and
   attempting to estimate another sidelink receive DRX pattern based on time resources indicated in additional decoded SCI.

14. A wireless communication device of a first user equipment (UE) comprising:
   a memory; and
   a processor coupled to the memory, the memory and the processor being configured to:
      decode a sidelink control information (SCI) from at least a second UE, the SCI indicating time resources reserved for future transmission to a third UE; and
      adapt a sidelink transmit discontinuous reception (DRX) pattern of the first UE based on the indicated time resources, wherein the processor adapts the sidelink transmit DRX pattern of the first UE by transmitting on an additional portion of the transmit DRX pattern based on an estimated sidelink receive DRX pattern of the third UE.

15. The wireless communication device of claim 14, wherein the processor is further configured to:
   identify the third UE from a destination ID included in the SCI; and
   derive a sidelink receive DRX pattern of the third UE based on the indicated time resources in subsequent SCIs including the third UE destination ID.

16. The wireless communication device of claim 15, wherein the processor derives the sidelink receive DRX pattern for the third UE by estimating a DRX period, ON duration, and offset, for the second UE to transmit to the third UE.

17. The wireless communication device of claim 15, wherein the processor derives the sidelink receive DRX pattern for the third UE by matching indicated time resources in SCIs with a predefined set of receive DRX patterns.

18. The wireless communication device of claim 14, wherein the processor is further configured to receive an indication that the third UE intends to listen for groupcast sidelink communications and an ID associated with the groupcast sidelink communications.

19. The wireless communication device of claim 14, wherein the processor is further configured to:
   decode SCI matching the ID associated with the groupcast sidelink communications; and
   estimate a sidelink receive DRX pattern of the third UE based on the indicated time resources in the SCI matching the ID associated with the groupcast sidelink communications.

20. The wireless communication device of claim 14, wherein the processor is further configured to:
   receive an indication that the third UE intends to listen for broadcast sidelink communications from a source ID.

21. The wireless communication device of claim 14, wherein the processor is further configured to:
   decode broadcast SCI matching the source ID; and
   estimate a sidelink receive DRX pattern of the third UE based on the indicated time resources in the SCI matching the ID associated with the groupcast sidelink communications.

22. The wireless communication device of claim 14, wherein the processor adapts the sidelink transmit DRX pattern of the first UE further by, if the additional portion of the transmit DRX pattern overlaps with a configured DRX pattern with a same period, dynamically adjusting the configured DRX pattern based on a union of the additional portion and the configured DRX pattern.

23. The wireless communication device of claim 14, wherein the processor adapts the sidelink transmit DRX pattern of the first UE further by, adding the additional portion of the transmit DRX pattern to a configured DRX pattern dynamically.

24. The wireless communication device of claim 14, wherein the processor is further configured to transmit on the additional portion before expiration of a timer.

25. The wireless communication device of claim 24, wherein the processor is further configured to reset the timer upon detecting additional SCIs indicating time resources that match the additional portion.

26. The wireless communication device of claim 25, wherein the processor is further configured to, upon expiration of the timer:
   suspend transmission on the additional portion; and
   attempt to estimate another sidelink receive DRX pattern based on time resources indicated in additional decoded SCI.

27. An apparatus comprising:
   means for decoding a sidelink control information (SCI) from at least a second UE, the SCI indicating time resources reserved for future transmission to a third UE; and
   means for adapting a sidelink transmit discontinuous reception (DRX) pattern of the first UE with respect to the third UE based on the indicated time resources, wherein the means for adapting the sidelink transmit DRX pattern of the first UE comprises means for transmitting on an additional portion of the transmit DRX pattern based on an estimated sidelink receive DRX pattern of the third UE.

28. A non-transitory computer readable medium storing instructions that when executed by a first user equipment (UE) cause the first UE to:
   decode a sidelink control information (SCI) from at least a second UE, the SCI indicating time resources reserved for future transmission to a third UE; and
   adapt a sidelink transmit discontinuous reception (DRX) pattern of the first UE with respect to the third UE based on the indicated time resources, wherein adapting the sidelink transmit DRX pattern of the first UE comprises transmitting on an additional portion of the transmit DRX pattern based on an estimated sidelink receive DRX pattern of the third UE.

* * * * *